United States Patent
Navarro et al.

(10) Patent No.: US 11,955,838 B2
(45) Date of Patent: Apr. 9, 2024

(54) FUEL CELL BASED UNINTERRUPTIBLE POWER SUPPLY SYSTEMS

(71) Applicant: Eaton Intelligent Power Limited, Dublin (IE)

(72) Inventors: George Arthur Navarro, Raleigh, NC (US); Swanand Juvekar, Morrisville, NC (US); Vincent Edward Wilder, Clayton, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/241,178

(22) Filed: Apr. 27, 2021

(65) Prior Publication Data
US 2021/0336475 A1 Oct. 28, 2021

Related U.S. Application Data

(60) Provisional application No. 63/016,634, filed on Apr. 28, 2020.

(51) Int. Cl.
*H02J 9/06* (2006.01)
(52) U.S. Cl.
CPC ............. *H02J 9/068* (2020.01); *H02J 9/062* (2013.01); *H02J 2300/30* (2020.01)
(58) Field of Classification Search
CPC ....................................................... H02J 9/06
See application file for complete search history.

(56) References Cited

U.S. PATENT DOCUMENTS

| | | | | |
|---|---|---|---|---|
| 2011/0187197 A1* | 8/2011 | Moth | ...................... | H02J 9/062 |
| | | | | 307/66 |
| 2012/0267952 A1 | 10/2012 | Ballantine | | |
| 2016/0172900 A1* | 6/2016 | Welch, Jr. | ............ | H05K 7/1492 |
| | | | | 307/64 |
| 2020/0059100 A1* | 2/2020 | Kawamoto | ........... | H02J 7/0068 |

(Continued)

FOREIGN PATENT DOCUMENTS

| | | | | |
|---|---|---|---|---|
| GB | 2530354 A | * | 3/2016 | ................ H02J 3/32 |
| KR | 101633754 B1 | * | 6/2016 | ................ H02J 3/32 |

(Continued)

OTHER PUBLICATIONS

A. Nasiri, Z. Nie, S. B. Bekiarov and A. Emadi, "An On-Line UPS System With Power Factor Correction and Electric Isolation Using BIFRED Converter," in IEEE Transactions on Industrial Electronics, vol. 55, No. 2, pp. 722-730, Feb. 2008, doi: 10.1109/TIE.2007.911199. (Year: 2008).*

(Continued)

*Primary Examiner* — Daniel Cavallari
(74) *Attorney, Agent, or Firm* — Stanek Lemon Crouse & Meeks, PA

(57) ABSTRACT

A system includes a DC bus and an auxiliary power source coupled to the DC bus. The system further includes an energy storage device and a modular uninterruptible power supply (UPS) including a first uninterruptible power module (UPM) coupled to the DC bus and configured to provide power to an AC load from the auxiliary power source and a second UPM coupled to the DC bus and the energy storage device and configured to transfer energy between the DC bus and the energy storage device to regulate a voltage on the DC bus.

12 Claims, 6 Drawing Sheets

(56) References Cited

U.S. PATENT DOCUMENTS

2020/0076200 A1    3/2020  Ballantine
2020/0336003 A1*  10/2020  Narla ..................... H02J 3/381

FOREIGN PATENT DOCUMENTS

WO    WO 2010/038152    4/2010
WO    WO 2018/083332    5/2018

OTHER PUBLICATIONS

International Search Report and Written Opinion for PCT/EP2021/025159, dated Jul. 27, 2021, 10 pages.
"Hydrogen and Fuel Cells for Data Center Applications Project Meeting: Workshop Report," National Renewable Energy Laboratory Technical Report NREL/TP-5400-75355 (Dec. 2019); 28 pages.
Eaton Power Xpert 9395P High Performance UPS 200-1200 kW/kVA; Product Information; Eaton.com/9395P; Jun. 2019; 12 pages.

* cited by examiner

US 11,955,838 B2

FUEL CELL BASED UNINTERRUPTIBLE POWER SUPPLY SYSTEMS

CLAIM OF PRIORITY

The present application claims priority to U.S. Provisional Patent Application No. 63/016,634, filed Apr. 28, 2020, the contents of which is hereby incorporated herein by reference in its entirety.

BACKGROUND

In a typical data center power distribution system, a utility power source may feed one or more uninterruptible power supply (UPS) systems that support a critical data center load. A utility feed may be connected to a data center UPS via an automatic transfer switch (ATS) that is also configured to receive power from an auxiliary engine-generator set. In particular, the utility feed may be coupled to one input of the ATS and the diesel engine-generator set coupled to another input of the ATS. When the primary utility source experiences an outage, the data center UPS may momentarily provide power to the critical load. If an outage lasts a sufficiently long time, the engine-generator set may be started and the ATS may transfer the critical load to the engine-generator.

Recently, alternative sources are being increasingly used to provide power to data centers. For example, "Hydrogen and Fuel Cells for Data Center Applications Project Meeting: Workshop Report," National Renewable Energy Laboratory Technical Report NREL/TP-5400-75355 (December 2019), describes the use of quieter, low-emission hydrogen fuel cells and other alternative sources to provide primary and backup power to data centers.

SUMMARY

Some embodiments provide a system including a DC bus and an auxiliary power source (e.g., a fuel cell) coupled to the DC bus. The system further includes a modular uninterruptible power supply (UPS) including a first uninterruptible power module (UPM) coupled to the DC bus and configured to provide power to an AC load from the auxiliary power source and a second UPM coupled to the DC bus and an energy storage device (e.g., a battery) and configured to transfer energy between the DC bus and the energy storage device to regulate a voltage on the DC bus.

In some embodiments, an AC port of the first UPM may be coupled to a first input of an automatic transfer switch (ATS) and an AC power source may be coupled to a second input of the ATS. The modular UPS may include a first UPS and the system may further include a second UPS that serves the AC load. An output of the ATS may be connected to a first AC port of the second UPS and a second port of the second UPS may be connected to the AC load and to an AC port of the second UPM of the first UPS.

In further embodiments, each of the first and second UPMs may include a UPM DC bus and first, second and third converters coupled to the UPM DC bus. The second converter of the first UPM may be coupled to the first input of the ATS, the first converter of the second UPM may be coupled to AC output of the second UPS, and the second converter of the second UPM may be coupled to the DC bus. The first converter of the first UPS may also be coupled to the first input of the ATS. The third converter of the first UPM may be coupled to the DC bus and the third converter of the second UPM may be coupled to the energy storage device.

In some embodiments, an AC port of the first UPM and an AC port of the second UPM may be coupled to an output of an ATS and an AC power source may be coupled to an input of the ATS. The ATS may be configured to disconnect the AC power source from the load and the first UPS and the second UPM are configured to provide power to the load when the AC power source is disconnected from the load.

In further embodiments, each of the first and second UPMs may include a UPM DC bus and first, second and third converters coupled to the UPM DC bus. The second converter of the first UPM may be coupled to the load, the first converter of the second UPM may be coupled to the load, and the second converter of the second UPM may be coupled to the DC bus. The first converter of the first UPS may also be coupled to the load. The third converter of the first UPM may be coupled to the DC bus and the third converter of the second UPM may be coupled to the energy storage device.

Still further embodiments provide a system including an ATS having a first input coupled to an AC power source and a UPS having an input coupled to an output of the ATS and an output coupled to a load. The system further includes a DC bus, a DC power source coupled to the DC bus, an energy storage device, a first converter coupled to the DC bus and a second input of the ATS and configured to provide power to the second input of the ATS from the DC power source, a second converter coupled to the energy storage device and the DC bus and configured to transfer energy between the DC bus and the energy storage device to regulate a voltage on the DC bus, and a third converter coupled to the DC bus and to the output of the UPS. The system may further include a modular UPS including first and second UPMs. The first converter may be included in the first UPM and the second and third converters may be included in the second UPM.

DETAILED DESCRIPTION

Figure 1:
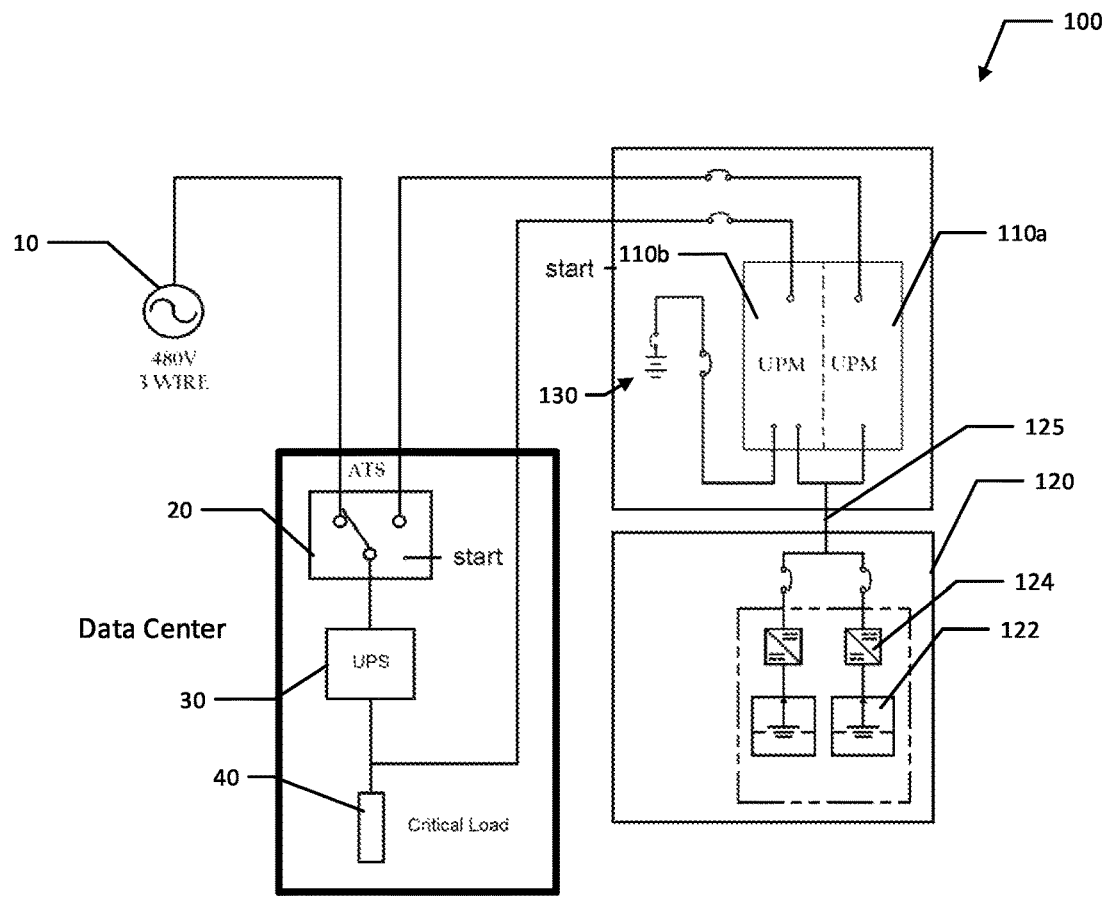
FIG. 1 is a schematic diagram of a fuel-cell based uninterruptible power system for data center applications according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates an uninterruptible power supply (UPS) system for data center applications according to some embodiments. The data center may include an automatic transfer switch (ATS) 20 that is configured to selectively provide power to a data center UPS 30 from a utility source 10 and a first uninterruptible power module (UPM) 110a of a UPS system including at least two such UPMs, here shown as including the first UPS 110a and a second UPM 110b. An example of a system having UPMs that may be adapted for such a configuration is the Eaton Power Xpert 9395 family of UPS systems described at https://www.eaton.com/us/en-us/catalog/backup-power-ups-surge-it-power-distribution/power-xpert-9395p-high-performance-ups.html. The data center UPS 30 provides power to a critical load 40, e.g., servers and other IT equipment in the data center. The first UPM 110a receives power from a fuel cell system 120, which may include multiple fuel cells 122 that feed power to a fuel cell system DC bus 125 (e.g., a 650 VDC bus) via respective converters 124. When the utility source 10 fails, the ATS 20 may transfer the data center UPS 30 and its associated load 40 to the first UPM 110a and provide power to the load 40 from the fuel cell system 120.

The second UPM 110b regulates a voltage on the fuel cell system DC bus 125 by sourcing and sinking energy from and to a battery 130. In this manner, the second UPM 110b can provide transient support for the fuel cell system DC bus 125. In particular, the load step response of the fuel cell system 120 may be delayed by hundreds of milliseconds due to delays arising from the relatively slow control response of the fuel cell system, which requires adjustment of the gas and air mixture to meet increases or decreases in load. The second UPM 110b momentarily delivers transient power to the fuel cell system DC bus 125 when there is a step increase in load by using the battery 130 to transfer energy to the fuel cell system DC bus 125. Conversely, when there is a step decrease in load, the second UPM 110b may transfer energy from the fuel cell system DC bus 125 to the battery 130.

Figure 2:
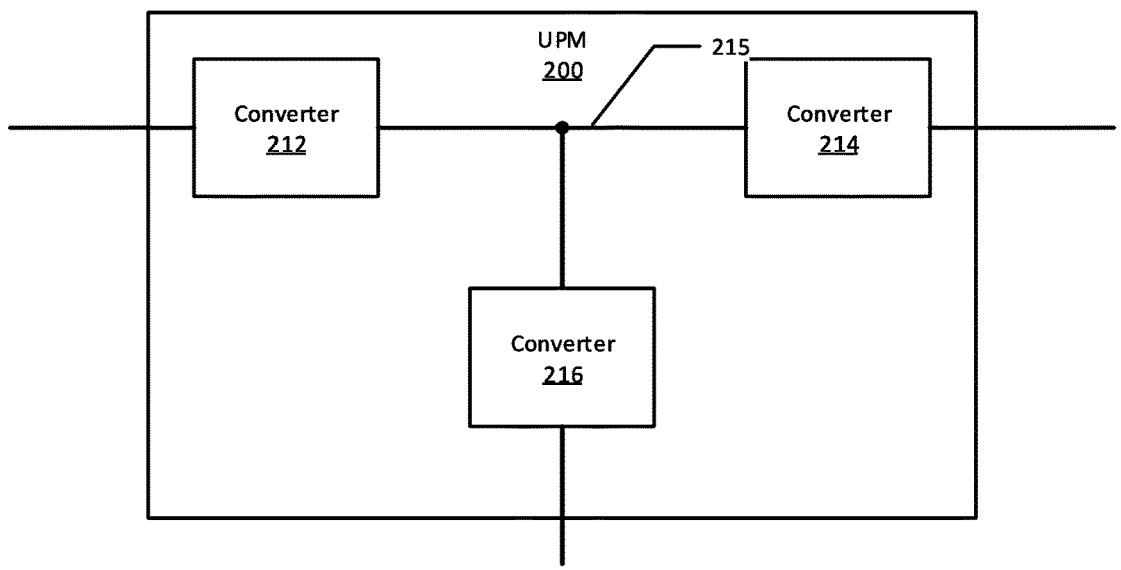
FIG. 2 is a schematic diagram of an uninterruptible power module (UPM) for use in the system of FIG. 1 according to some embodiments.

FIG. 2 illustrates an exemplary architecture of a UPM 200 that may be used for the first and second UPMs 110a, 110b shown in FIG. 1. The UPM 200 includes three converters 212, 214, 216 which are interconnected by a DC bus 215. The converters 212, 214, 216 may be flexibly configurable to operate as AC/DC converters (e.g., rectifiers and inverters) or DC/DC converters, allowing this UPM structure to be flexibly used in a variety of different applications, such as the one illustrated in FIG. 1.

Figure 3:
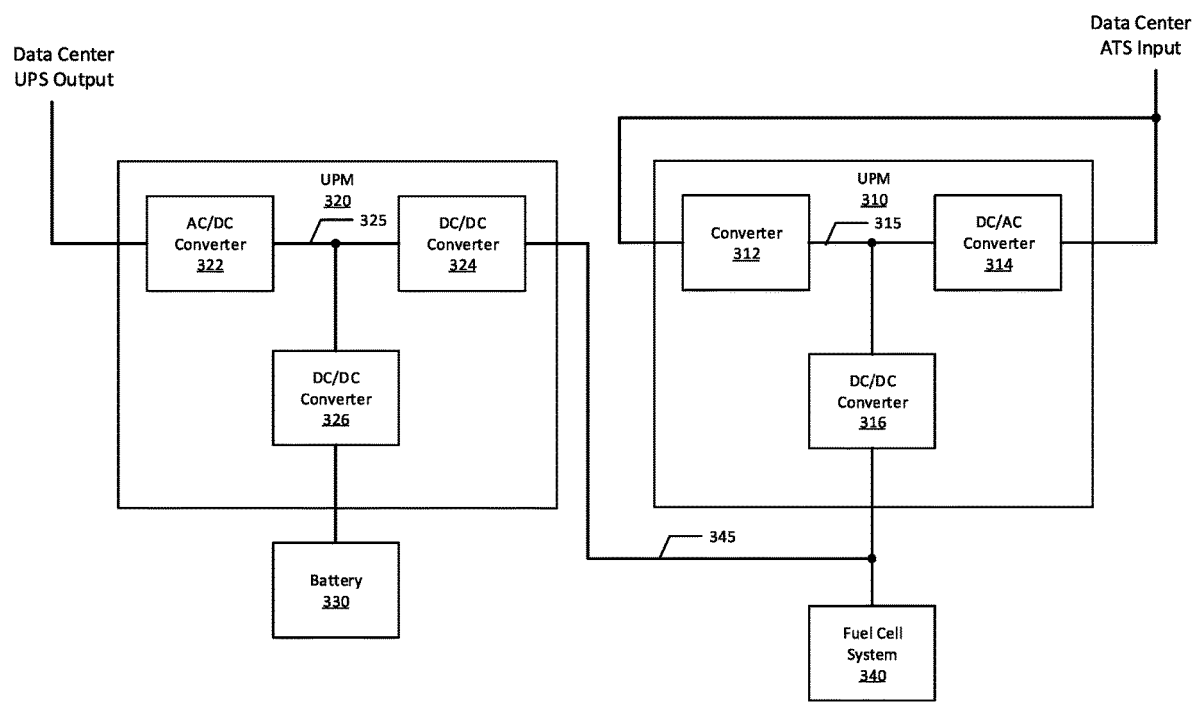
FIG. 3 is a schematic illustration of an implementation of the system of FIG. 1 using UPMs along the lines illustrated in FIG. 2 according to some embodiments.

In particular, FIG. 3 illustrates an exemplary use of UPMs with such an architecture to implement the arrangement shown in FIG. 1. A first UPM 310 includes a converter 314 that is configured as a DC/AC converter (inverter) to provide an AC output to an input of the data center ATS from a DC bus 315. Another converter 316 of the first UPM 310 is configured as a DC/DC converter that is coupled to a fuel cell system 340 via a fuel cell system DC bus 345. The DC/DC converter 316 is configured to transfer energy from the fuel cell system DC bus 345 to the DC bus 315, while the DC/AC converter 314 provides backup power transferred to the DC bus 315 to the data center ATS for maintaining the data center load when the primary utility source is absent. A third converter 312 of the first UPM 310 is connected as shown.

A second UPM 320 includes a converter 322 configured as an AC/DC converter (rectifier) to receive AC power from the output of the data center UPS (or the incoming utility source) and to provide DC power to a DC bus 325. Another converter 324 is configured as a DC/DC converter to source and sink power to and from the fuel cell system DC bus 345, and a third converter 326 is configured as a DC/DC converter to source and sink power to and from a battery 330. The AC/DC converter 322 and the DC/DC converter 326 are used to manage the battery 330, maintaining a desired state of charge (SOC) by charging the battery using power from the datacenter UPS (or the incoming utility source) and the fuel cell system DC bus 345 and drawing energy from the battery to support the fuel cell system DC bus 345. The DC/DC converter 324 is used to regulate the voltage on the fuel cell system DC bus 345 using power drawn from the battery 330 via the DC bus 325, thus providing transient support when the data center load is being served by the fuel cell system 340. Because of the dual sink and source role of the battery 330, the desired SOC for the battery 330 may be an intermediate level of charge that affords sufficient capacity to meet transient load needs while maintaining sufficient headroom to allow the battery 330 to sink sufficient energy from the fuel cell system DC bus 345 to maintain a desired voltage on the fuel cell system DC bus 345.

Figures 4A, 4B:
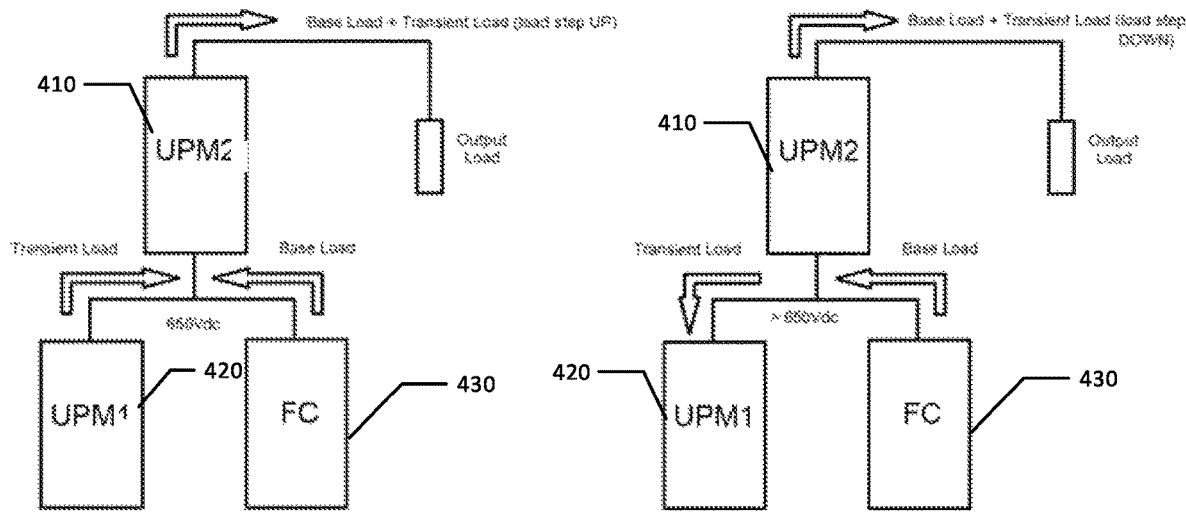
FIGS. 4A and 4B illustrate power flows of the system of FIG. 1 according to some embodiments.

FIGS. 4A and 4B illustrate example power flows that can be supported by the systems described above with reference to FIGS. 1-3. Referring to FIG. 4A, a fuel cell system FC 430 may provide a base load via a first UPM 410 while a second UPM 420 temporarily provides additional power to support an increase in load until the fuel cell system 430 adjusts to the increased load. As shown in FIG. 4B, when the base output of the fuel cell system 430 exceeds the load, the second UPM 420 can be used to momentarily sink power until the output of the fuel cell system 430 decreases.

Additional embodiments may provide low cost implementations in which the battery (e.g., the battery 130 shown in FIG. 1) may be eliminated. In particular, depending on the magnitude of the output load transients, the second UPM 110*b* shown in FIG. 1 may not need a battery if it has a capacitor bank on its DC bus that is sufficient in size to deliver/absorb the fuel cell system's transient power needs. Such an approach may reduce system footprint and eliminate battery-related maintenance costs.

Embodiments of the inventive subject matter may also reduce or eliminate the need for diesel or natural gas powered gensets to provide backup power for a data center, supplanting such with a fuel cell system. Some embodiments can provide grid support by incorporating a fuel cell capacity sufficient to both meet critical power backup needs and supply grid loads. In some embodiments, the UPMs can also provide behind-the-meter energy management and gird ancillary services where, for example, use of the fuel cell system can be based on grid-related parameters, such as current utility pricing, such that the fuel cell may supplant the utility under certain conditions other than utility failure (e.g., peak demand conditions). The fuel cell could also be used for other grid support functions, such as frequency control.

Figure 5:
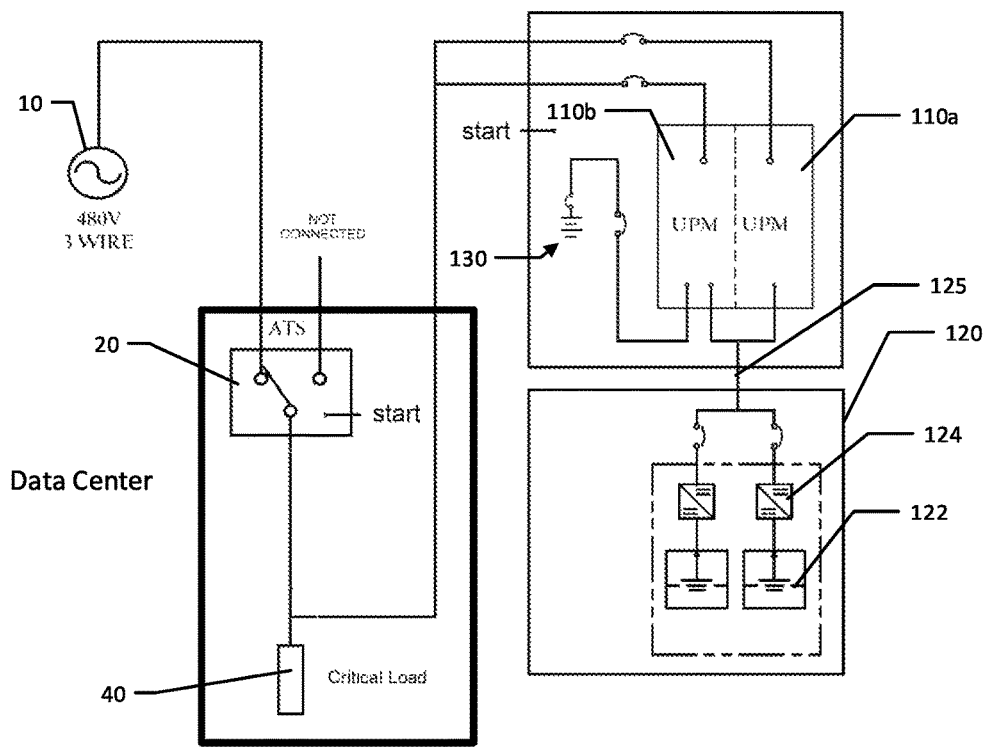
FIG. 5 is a schematic diagram of a fuel-cell based uninterruptible power system for data center applications according to further embodiments.
Figure 6:
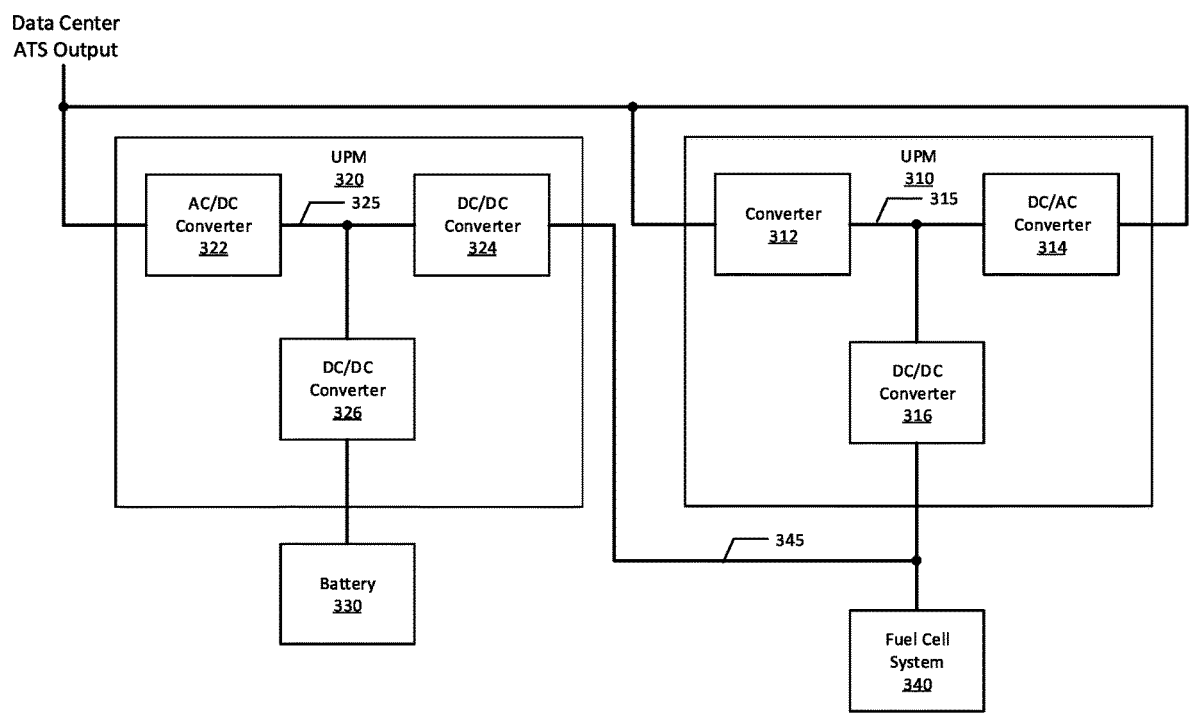
FIG. 6 is a schematic illustration of an implementation of the system of FIG. 5 using UPMs along the lines illustrated in FIG. 2 according to some embodiments.

FIGS. 5 and 6 illustrate further embodiments where UPM-based arrangements along the lines of FIGS. 1 and 3 can be used to eliminate a UPS as conventionally used in some data center and other applications. Referring to FIG. 5, both of the first and second UPMs 110*a*, 110*b* may be connected to the critical load 40 without an intervening UPS as shown in FIG. 1. As shown in FIG. 6, this may be implemented using UPMs with the structure illustrated in FIG. 2. Such arrangements can reduce capital costs. The system can be operated in an enhanced efficiency mode when the utility 10 is present and the ATS 20 connects the load to the utility 10, with the UPMs used to provide voltage and/or VAR control to support the load bus voltage. In some embodiments, the ATS 20 could be replaced with a basic circuit breaker or recloser, which could be located outside of the datacenter along with other components of the fuel cell system, thus offering another step toward capital cost reduction and equipment optimization.

Figure 7:
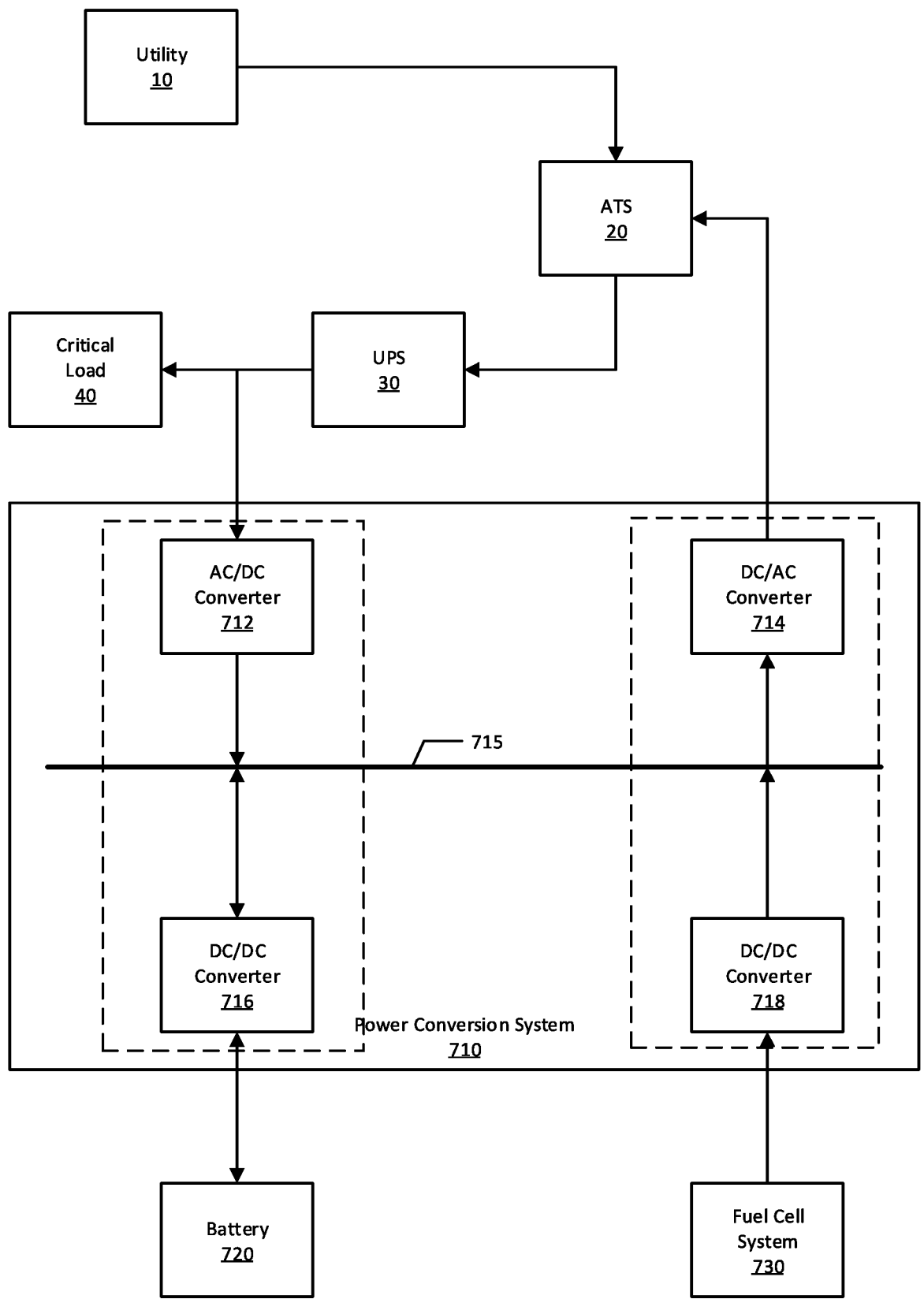
FIG. 7 is a schematic diagram of a fuel-cell based uninterruptible power system for data center applications using a monolithic power conversion apparatus according to some embodiments.

According to further embodiments, a monolithic system may be used instead of the modularized arrangements shown in FIGS. 1-6. For example, as shown in FIG. 7, a monolithic power conversion system may include an AC/DC converter 712, a DC/AC converter 714 and first and second DC/DC converters 716, 718, all tied to a common DC bus 715. The second DC/DC converter 718 provides power to the DC bus 715 from a fuel cell system 730. The AC/DC converter 712 and the first DC/DC converter maintain a specified voltage on the DC bus 715, with the battery 720 being used to source and sink transient power when the system is powering the load 40 from the fuel cell system 730 during an outage of the utility 10.

Figure 8:
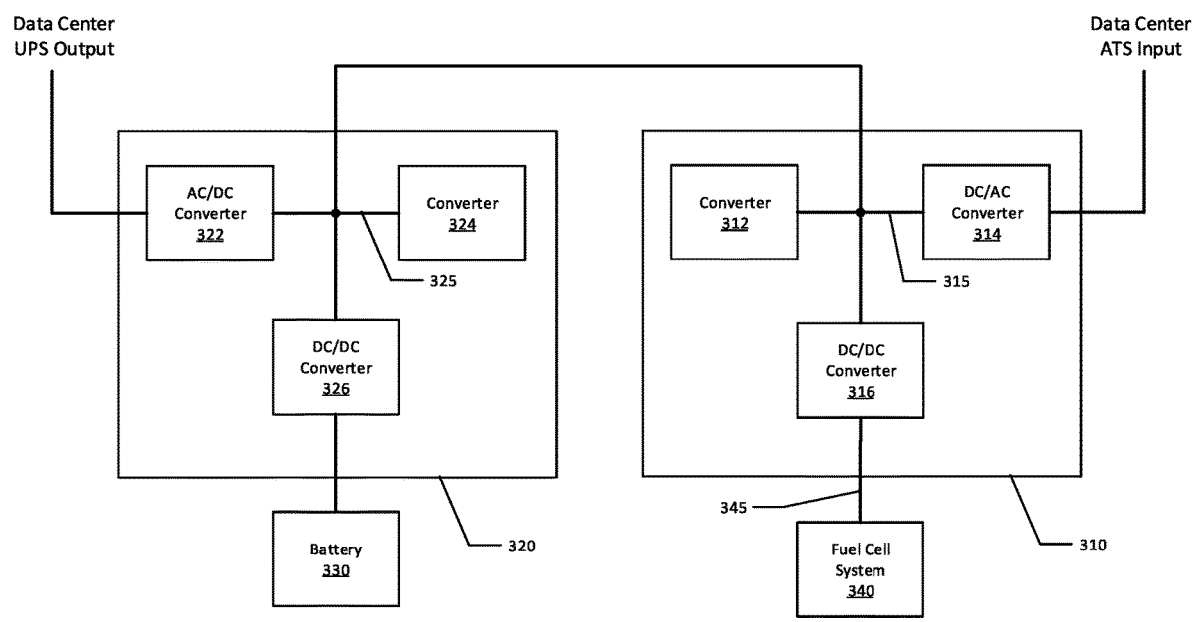
FIG. 8 is a schematic illustration of an implementation of the system of FIG. 7 using UPMs along the lines illustrated in FIG. 2 according to some embodiments.

As shown in FIG. 8, a system along the lines of FIG. 7 may be implemented using UPMs 310, 320 having the structure shown in FIG. 2. A first UPM 310 includes a converter 314 that is configured as a DC/AC converter (inverter) to provide an AC output to an input of the data center ATS from a DC bus 315. Another converter 316 of the first UPM 310 is configured as a DC/DC converter that is coupled to a fuel cell system 340. The DC/DC converter 316 is configured to transfer energy from the fuel cell system DC bus 345 to the DC bus 315, while the DC/AC converter 314 provides backup power transferred from the DC bus 315 to the data center ATS for maintaining the data center load when the primary utility source is absent. A third converter 312 of the first UPM 310 is not utilized.

A second UPM 320 includes a converter 322 configured as an AC/DC converter (rectifier) to receive AC power from the output of the data center UPS and to provide DC power to a DC bus 325. Another converter 326 is configured as a DC/DC converter to source and sink power to and from a battery 330. The AC/DC converter 322 and the DC/DC converter 326 are used to manage the battery 330, maintaining a desired state of charge (SOC) by charging the battery using power from the datacenter UPS and the fuel cell system DC bus 345 and drawing energy from the battery to support the fuel cell system 340. The DC/DC converter 324 is not utilized in this configuration.

In this specification, there have been disclosed embodiments of the inventive subject matter and, although specific terms are employed, they are used in a generic and descriptive sense only and not for purposes of limitation. The following claims are provided to ensure that the present application meets all statutory requirements as a priority application in all jurisdictions and shall not be construed as limiting the scope of the inventive subject matter.

What is claimed is:

1. A system comprising:
a DC bus;
an auxiliary power source coupled to the DC bus;
an energy storage device of a different type than the auxiliary power source; and
a modular uninterruptible power supply (UPS) comprising:
a first uninterruptible power module (UPM) coupled to the DC bus and configured to provide power to an AC load from the auxiliary power source; and
a second UPM coupled to the DC bus and the energy storage device and configured to compensate for a delay of a load step response of the auxiliary power source by transferring energy between the DC bus and the energy storage device to regulate a voltage on the DC bus, wherein an AC port of the first UPM is coupled to a first input of an automatic transfer switch (ATS), wherein an AC power source is coupled to a second input of the ATS, and wherein the ATS is configured to selectively provide power from the first UPM and the AC power source to a load connected to an output of the ATS.

2. A system comprising:
a DC bus;
an auxiliary power source coupled to the DC bus;
an energy storage device;
a modular first uninterruptible power supply (UPS) comprising:
a first uninterruptible power module (UPM) coupled to the DC bus and configured to provide power to an AC load from the auxiliary power source, wherein an AC port of the first UPM is coupled to a first input of an automatic transfer switch (ATS), wherein an AC power source is coupled to a second input of the ATS, and wherein the ATS is configured to selectively provide power from the first UPM and the AC power source to a load connected to an output of the ATS; and
a second UPM coupled to the DC bus and the energy storage device and configured to transfer energy between the DC bus and the energy storage device to regulate a voltage on the DC bus; and
a second UPS, wherein an output of the ATS is connected to a first AC port of the second UPS and wherein a second port of the second UPS is connected to the AC load and to an AC port of the second UPM of the first UPS.

3. The system of claim 2, wherein each of the first and second UPMs comprises:
 a UPM DC bus; and
 first, second and third converters coupled to the UPM DC bus.

4. The system of claim 3, wherein the second converter of the first UPM is coupled to the first input of the ATS, wherein the first converter of the second UPM is coupled to AC output of the second UPS, and wherein the second converter of the second UPM is coupled to the DC bus.

5. The system of claim 4, wherein the first converter of the first UPM is coupled to the first input of the ATS.

6. The system of claim 4, wherein the third converter of the first UPM is coupled to the DC bus and wherein the third converter of the second UPM is coupled to the energy storage device.

7. The system of claim 1, wherein the auxiliary power source comprises a fuel cell system.

8. A system comprising:
 an ATS having a first input coupled to an AC power source;
 a UPS having an input coupled to an output of the ATS and an output coupled to a load;
 a DC bus;
 a DC power source coupled to the DC bus;
 an energy storage device;
 a first converter coupled to the DC bus and a second input of the ATS and configured to provide power to the second input of the ATS from the DC power source, wherein the ATS is configured to selectively provide power from the first converter and the AC power source to the input of the UPS;
 a second converter coupled to the energy storage device and the DC bus and configured to transfer energy between the DC bus and the energy storage device to regulate a voltage on the DC bus; and
 a third converter coupled to the DC bus and to the output of the UPS.

9. The system of claim 8, comprising a modular UPS comprising first and second UPMs, wherein the first converter is included in the first UPM and wherein the second and third converters are included in the second UPM.

10. The system of claim 9, wherein each of the first and second UPMs comprises:
 a UPM DC bus; and
 three converters coupled to the UPM DC bus.

11. The system of claim 10, wherein the UPM DC buses of the first and second UPMs are interconnected.

12. A system comprising:
 an DC bus;
 an auxiliary power source coupled to the DC bus;
 an energy storage device of a different type than the auxiliary power source;
 a first (UPS) comprising:
  a first uninterruptible power module (UPM) coupled to the DC bus and configured to provide power to an AC load from the auxiliary power source; and
  a second UPM coupled to the DC bus and the energy storage device and configured to compensate for a delay of a load step response of the auxiliary power source by transferring energy between the DC bus and the energy storage device to regulate a voltage on the DC bus; and
 a second UPS,
 wherein an AC port of the first UPM is coupled to a first input of an automatic transfer switch (ATS) and wherein an AC power source is coupled to a second input of the ATS, wherein an output of the ATS is connected to a first AC port of the second UPS and wherein a second port of the second UPS is connected to the AC load and to an AC port of the second UPM of the first UPS.

* * * * *